Dec. 7, 1948.   R. E. OLSON   2,455,605
PASTEURIZING SYSTEM
Filed Feb. 7, 1947   2 Sheets-Sheet 1
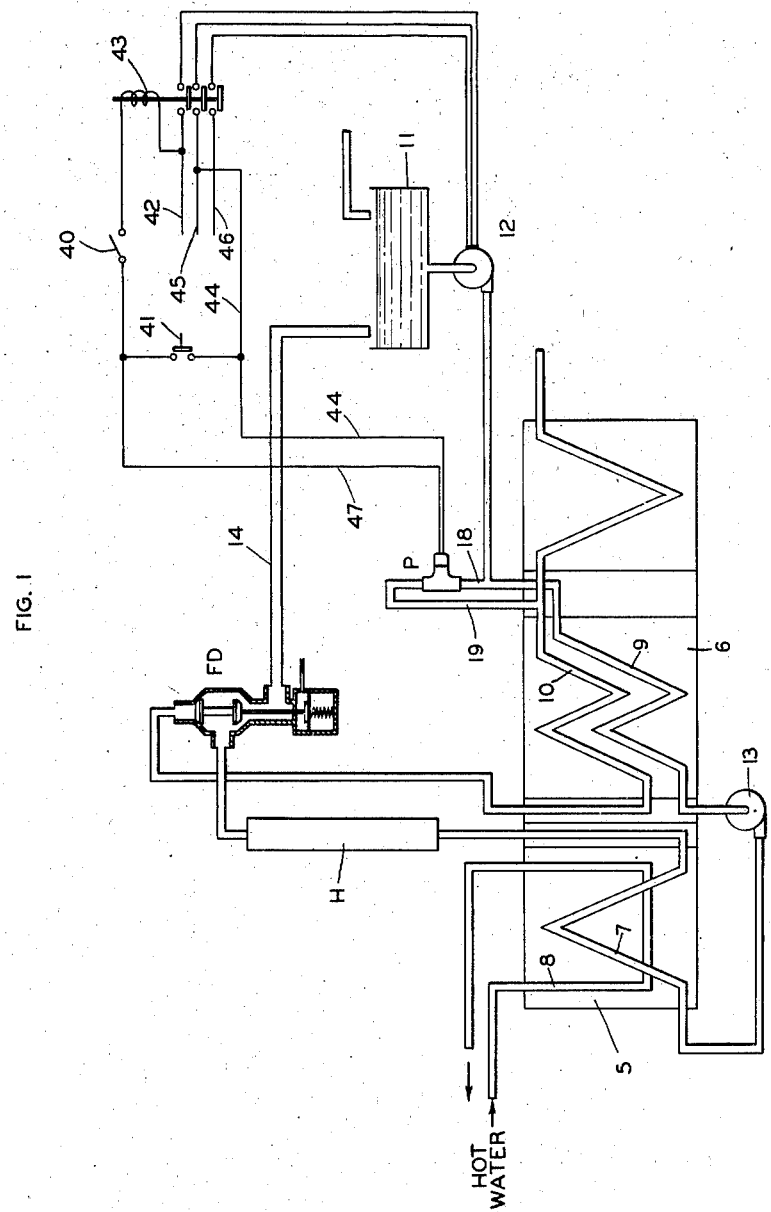
INVENTOR.
RAYMOND E. OLSON
BY

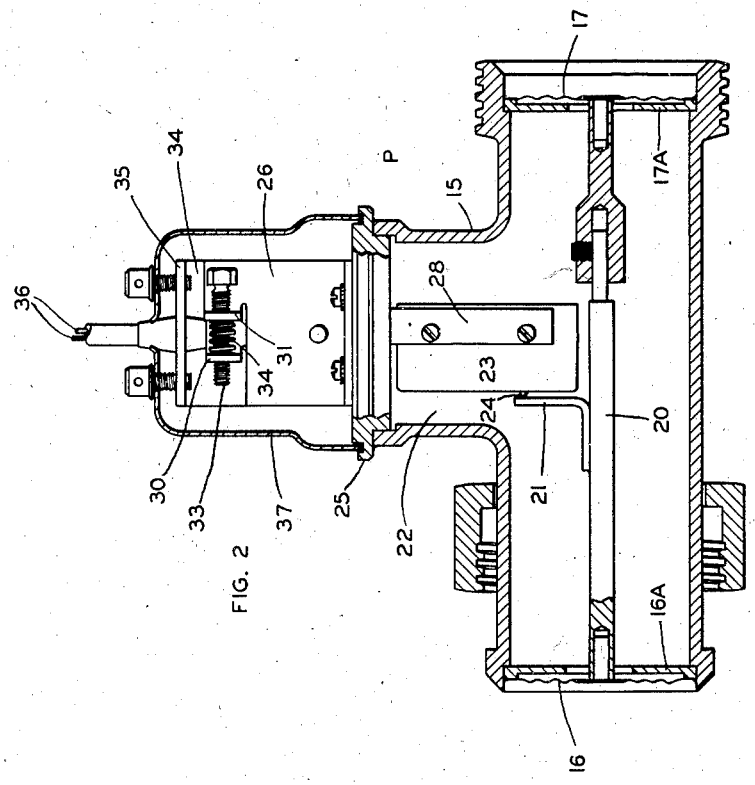
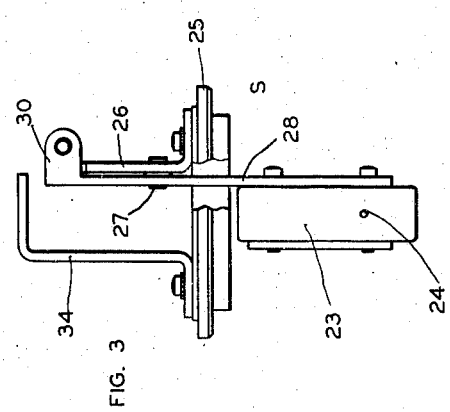

Patented Dec. 7, 1948

2,455,605

UNITED STATES PATENT OFFICE 2,455,605

PASTEURIZING SYSTEM

Raymond E. Olson, Pittsford, N. Y., assignor to Taylor Instrument Companies, Rochester, N. Y., a corporation of New York Application February 7, 1947, Serial No. 727,086

3 Claims. (Cl. 257—2)

This invention relates to a pasteurizing system.

In the pasteurization of a liquid such as milk or the like, it is customary to cause the liquid, after it has been pasteurized, to flow through a regenerator in heat exchange relation to some of the flowing unpasteurized liquid so that a portion of the heat in the pasteurized liquid can be recovered. If a leak develops in the regenerator of the present apparatus it is possible, under certain pressure conditions, for the unpasteurized liquid to leak into the pasteurized liquid with the resultant contamination.

In accordance with the present invention there is provided a pasteurizing system in which the pasteurized liquid is normally maintained at a higher pressure than the pressure of the unpasteurized liquid in heat exchange relation therewith so that any leakage will be from the pasteurized liquid to the unpasteurized liquid and not vice versa. However, if this normal pressure condition becomes reversed, provision is made for stopping the flow of at least one of said liquids.

The various features and advantages of the invention will appear from the detailed description and claims when taken with the drawing in which Fig. 1 is a diagrammatic showing of a pasteurizing system in accordance with the present invention; Fig. 2 is a longitudinal section through a differential switching unit which is incorporated in the system of Fig. 1 and which forms a part of the present invention; and Fig. 3 is a detailed view of a portion of the switching unit, partially broken away showing the micro-switch and its mounting.

The present invention is intended for use in a pasteurizing system more completely disclosed in applicant's copending application Serial No. 716,-222, filed Dec. 14, 1946. In that system there is employed a combined pasteurizing unit 5 and a regenerating unit 6. In the pasteurizing unit 6 the milk or other liquid to be pasteurized flows through a set of coils or plates 7 in heat exchange relation to a set of heating coils or plates 8 through which there is recirculated water maintained at a temperature slightly above the pasteurizing temperature.

The regenerating unit 6 includes two passageways 9 and 10 in heat exchange relation to each other. The raw milk from the tank 11 is pumped by the pump 12 through the passageway 9 and by the timing pump 13 through the passageway 7 of the pasteurizer. The milk leaving the pasteurizer passageway 7 passes into a suitable holding tube H through which it travels for the required fifteen second holding interval required in so-called short time pasteurization and then passes through the flow diversion valve FD through the passageway 10 of the regenerator. Thus the regenerator conducts the pasteurized milk from the pasteurizer in heat exchange relation to the raw milk in the passageway 9 thereby serving to cool the pasteurized milk and to heat partially, the incoming raw milk.

If, however, the milk has not been heated to the proper temperature in passageway 7, suitable means, as shown in the mentioned Olson application, operates the flow diversion valve FD, to divert the improperly processed milk through a pipe 14 to the tank 11 so that this milk can be reprocessed. The two passageways 9 and 10 through the regenerator, are normally defined by a series of plates that can be readily taken apart and reassembled daily for purposes of cleaning. In view of this construction it is possible, on rare occasions, for the milk in one passage to leak into the other passage especially if the raw milk is under a higher pressure than the pasteurized milk in the other passage, then the pasteurized milk will become contaminated.

In accordance with the present invention, provision is made for insuring that the pasteurized milk in the regenerator will always be at a higher pressure than the raw milk in the regenerating unit so that any leakage in the regenerator will be from the pasteurized milk to the raw milk. If, however, this desired pressure relation becomes reversed, there is provided a differential pressure unit which will immediately function to stop the flow of milk through one or both passages in the regenerator. For this purpose there is provided a sanitary differential pressure unit P, including a T-shaped fitting 15 having its opposing ends respectively sealed by the flexible corrugated diaphragms 16 and 17, which are backed by suitable protective stops 16a and 17a. A branch pipe 18 which is connected to the inlet of the passageway 9, applies the pressure of the raw milk to the lower surface of the diaphragm 17. Similarly, the branch pipe 19 which is connected to the outlet of the pasteurized milk passageway 10, applies the pressure of the pasteurized milk to the upper surface of the diaphragm 16. A rod 20 of adjustable length, has its ends soldered respectively to the inner surfaces of the diaphragms 16 and 17. This rod has a bracket 21 secured thereto at a point opposite the side opening 22 in the fitting 15. A switching unit generally designated S (Fig. 3), includes a micro-switch 23 which has its actuating button 24 supported in a position to cooperate with the free end of the bracket 21.

The switch S comprises an annular plate 25 having its outer margin adapted to be sealed to the fitting in the opening 22. The plate 25 carries a projecting support 26. The support has pivoted thereon at 27, a lever 28 on the lower end of which the microswitch 23, is supported. The lever 28 is pivotally mounted so that the button 24 of the microswitch 23 can be swung toward or away from the bracket 21 in order to select the pressure value at which the microswitch will be operated. The swinging adjustment of the lever 28 may be effected in any well-known manner. As herein illustrated, this adjustment is effected by a flange 30 on the outer end of the lever 28 and a cooperating flange 31 on the outer end of the support 26, both flanges being in parallel planes which are also parallel to the principal axis of the lever 28. A differential adjusting screw 33, which passes through a coil spring 34 interposed between the flanges 30 and 31, is threaded into both of these flanges. Thus when the screw 33 is turned in one direction, these flanges will be drawn toward each other and when the screw is turned in the other direction the flanges will tend to be separated with the consequent swinging movement of the lever 28.

The plate 25 also has secured thereto the support 34 which projects therefrom in a direction parallel to the support 26. The support 34 terminates at its outer end in an angular flange 35. This flange carries the conductors 36 leading to the microswitch 23, and also tightly holds the rim of a cuplike closure 37 in sealed relation with the plate 25.

When starting the system in operation the ordinary toggle switch 40 is operated to close a break point in the electrical operating circuit. At the same time the pump 13 is started by means (not shown) and the non-locking manual key 41 is held depressed. The closure of this key completes a circuit from conductor 42 leading to the current source, winding of the relay 43, switch 40, now closed and contacts of the manual key, now depressed, conductor 44, to conductor 45 leading to the current source. Relay 43 is energized in this circuit and at its front contacts, the conductors 42, 45 and 46 are closed from the power source to the motor (not shown), which drives the pump 12. As soon as the normal flow of raw milk and pasteurized milk is established in both passages of the regenerator, the manual key 41 can be released, since the circuit of relay 43 will be maintained by the microswitch 23, through conductors 44 and 47, as long as the pressure of the pasteurized milk in the passage 10 and branch 19 is greater than the pressure of the raw milk in passage 9 and branch 18. When, however, this pressure relation is reversed due to some abnormal condition, the microswitch 23 opens its contacts, thereby interrupting the operating circuit of relay 43, which releases. The release of relay 43 opens the operating circuit of the motor pump 12, which immediately stops. The pressure of the raw milk in passage 9 promptly drops to zero, so that there can be no leakage of raw milk into the pasteurized milk.

What I claim is:

1. In a pasteurizing system, a heating unit provided with a primary passage for a heating liquid and with a secondary passage for a liquid to be heated, said passages being in heat exchange relation with each other, means for causing said heating liquid to flow through said primary passage at a given pressure, and means for causing the liquid to be heated to flow through said secondary passage at a pressure normally lower than said given pressure, and means responsive to a change in the normal pressure relation between the liquids in said passages for stopping the flow of liquid through said secondary passages.

2. In a pasteurizing system, a heating unit provided with a primary passage for a heating liquid and with a secondary passage for a liquid to be heated, said passages being in heat exchange relation with each other, means for causing said heating liquid to flow through said primary passage at a given pressure, means including a pump for causing the liquid to be heated to flow through said secondary passage at a pressure normally lower than said given pressure, and means responsive to a change in the normal pressure relation between the liquids in said passages for stopping said pump.

3. In a pasteurizing system, a heating unit provided with a primary passage for a heating liquid and with a secondary passage for a liquid to be heated, said passages being in heat exchange relation with each other, means for causing said heating liquid to flow through said primary passage at a given pressure, means including an electrically operated pump and a circuit therefor for causing the liquid to be heated to flow through said secondary passage at a pressure normally lower than said given pressure, and differential pressure means responsive to a change in the normal pressure relation between the liquids in said passages for stopping said pump, said differential pressure means including a diaphragm exposed to the pressure of the liquid in the primary passage, a second diaphragm exposed to the pressure of the liquid in the secondary passage, and a switch jointly actuated by said diaphragms, said switch serving to control said circuit.

RAYMOND E. OLSON.

REFERENCES CITED

The following references are of record in the file of this patent:

UNITED STATES PATENTS

| Number | Name | Date |
| --- | --- | --- |
| 1,459,218 | Knaak | June 19, 1923 |
| 2,031,502 | Powell | Feb. 18, 1936 |
| 2,254,387 | Olcott | Sept. 2, 1941 |